United States Patent [19]

DeMars

[11] Patent Number: 5,244,370
[45] Date of Patent: Sep. 14, 1993

[54] HASH BROWN DEPOSITOR

[75] Inventor: Jimmy A. DeMars, Hugo, Minn.

[73] Assignee: Pillsbury Company, Minneapolis, Minn.

[21] Appl. No.: 823,164

[22] Filed: Jan. 21, 1992

[51] Int. Cl.$^5$ .......................................... B29C 47/30
[52] U.S. Cl. .................................... 425/72.1; 34/90; 99/353; 222/345; 425/145; 425/190; 425/377; 425/382.3; 425/464; 426/517
[58] Field of Search .................. 99/353, 483; 34/90, 34/236; 222/345, 368; 264/142, 163; 425/72.1, 145, 190, 317, 376.1, 377, 382.3, 382.4, 464; 426/503, 516, 517

[56] References Cited

U.S. PATENT DOCUMENTS

| | | | |
|---|---|---|---|
| 1,309,862 | 7/1919 | Lewison | 425/145 |
| 3,046,602 | 7/1962 | Houvener | 425/464 |
| 3,344,752 | 10/1967 | Ilines | 107/14 |
| 3,692,537 | 9/1972 | Gerkens | 99/100 |
| 3,726,149 | 4/1973 | Ilines | 74/141.5 |
| 3,792,945 | 2/1974 | Randall | 425/382.3 |
| 3,892,511 | 7/1975 | Farrant et al. | 425/464 |
| 3,937,608 | 2/1976 | Farrant et al. | 425/159 |
| 4,192,900 | 3/1980 | Cheng | 426/579 |
| 4,221,842 | 9/1980 | Toft | 426/550 |
| 4,395,427 | 7/1983 | Fischer et al. | 264/142 |
| 4,413,973 | 11/1983 | Peters | 425/382.3 |
| 4,455,321 | 6/1984 | Glabe et al. | 426/549 |
| 4,517,215 | 5/1985 | Hsu | 426/557 |
| 4,578,021 | 3/1986 | Schermutzki | 425/382.3 |
| 4,623,307 | 11/1986 | Froeschke | 425/382.3 |
| 4,815,959 | 3/1989 | Stoeckli | 99/353 |
| 4,850,833 | 7/1989 | Pinto et al. | 426/516 |
| 4,976,978 | 12/1990 | Schubert | 426/295 |

FOREIGN PATENT DOCUMENTS 2444495  8/1980  France ......................... 264/142

Primary Examiner—Scott Bushey
Attorney, Agent, or Firm—Kinney & Lange

[57] ABSTRACT

A food depositing apparatus for depositing hash brown potato strands includes a plurality of depositing assemblies. Each of the depositing assemblies includes a plurality of outlets. A pump member coupled to the inlets of the depositing assemblies provides pressure to force a potato slurry through the outlets of the depositing assemblies. A plurality of rotary valve components are positioned adjacent the outlets of the depositing assemblies. Each rotary valve component includes a plurality of wiper blades which correspond to the outlets. Each wiper blade has a first state that permits the potato slurry to be forced through the corresponding outlets and a second state that stops the flow of potato slurry to create a hash brown potato strand. A conveyor positioned beneath the outlets carries the formed hash brown potato strands to a drier. The drier dehydrates the formed hash brown potato strands. Changing the speed of rotation of the rotary valve components and/or the size of the wiper blades controls the lengths of hash brown potato strands produced by the depositing apparatus.

20 Claims, 8 Drawing Sheets

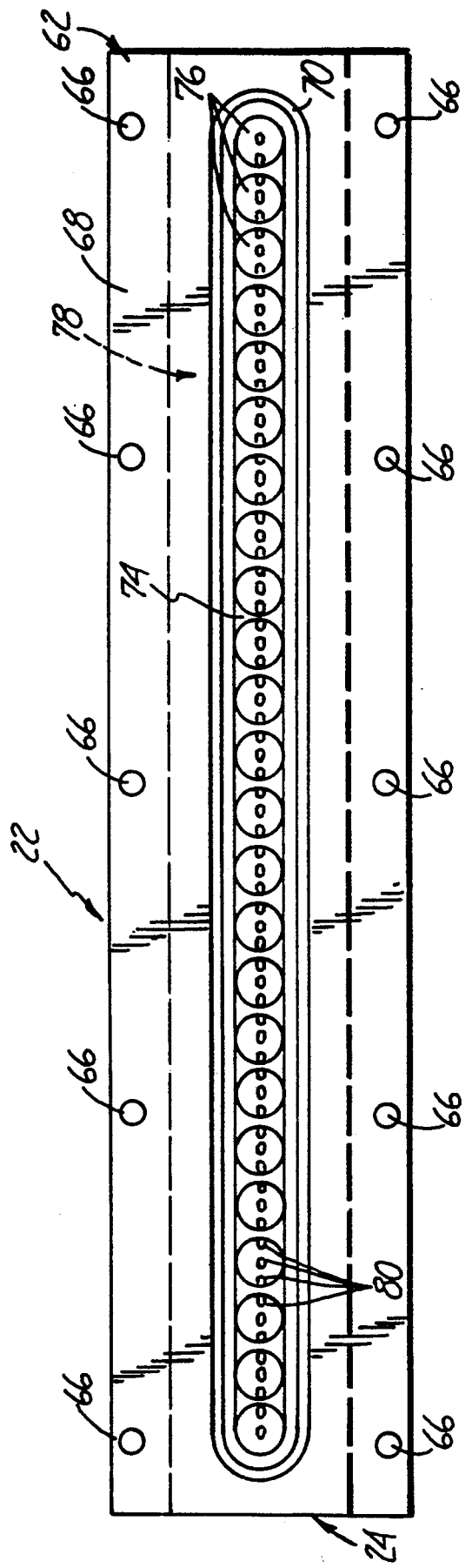

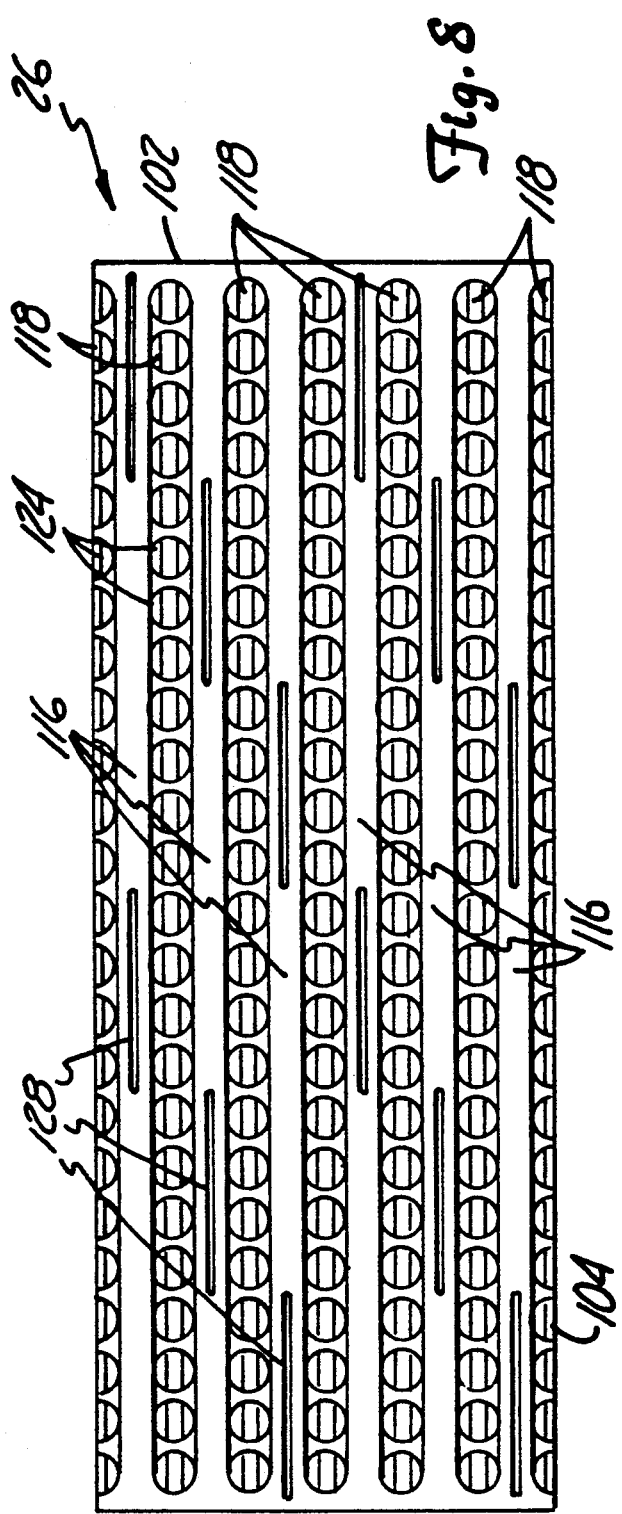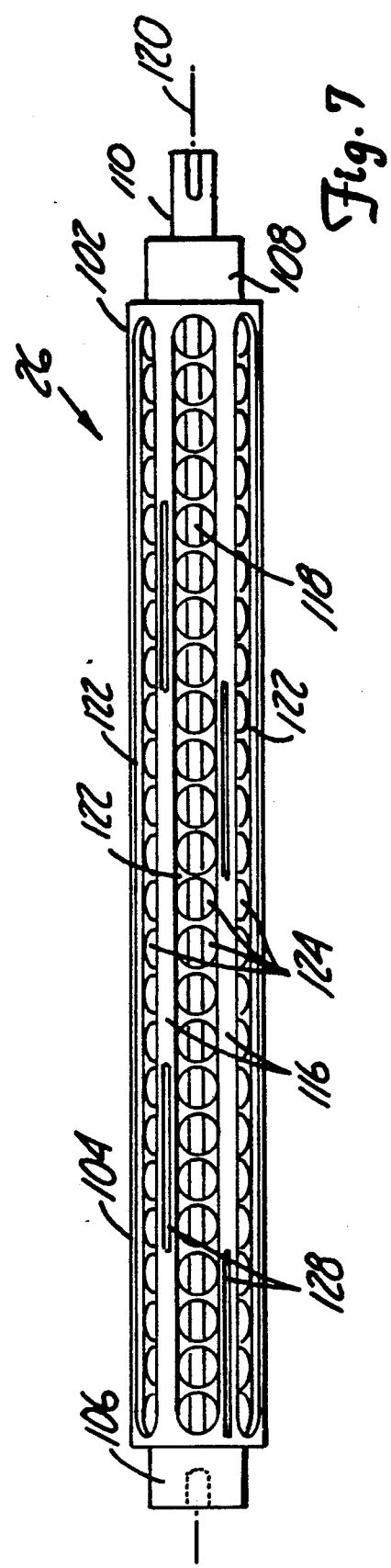

HASH BROWN DEPOSITOR

BACKGROUND OF THE INVENTION

The present invention relates generally to devices for extruding food products. In particular, the present invention is an apparatus for depositing hash brown potatoes consisting of varying lengths of potato strands.

Apparatus for depositing semi-solid, starch based food products are generally known. U.S. Pat. No. 3,937,608 to Farrant et al. discloses one such apparatus for extruding and cutting potato dough to form french fries ready for deep-fat frying. The apparatus includes an extrusion machine, a dough container (that can be removed from and placed within the extrusion machine) and a cutting device. The container has a circular opening at one end and a two-piece pressure plate structure which is movably received through a second end of the container. With the container removed from the extrusion machine, a dry or dehydrated potato mix can be mixed with water in the container to make the potato dough used to form the french fries.

The extrusion machine includes a vertically movable pressure plate which is driven by a motor and an extrusion dieplate having extrusion holes. With the container positioned within the extrusion machine, the motor driven pressure plate of the extrusion machine acts on the movable pressure plate of the container to force the potato dough within the container out through the extrusion holes of the dieplate.

After a predetermined period of time, extrusion ceases and the extruded potato dough french fries are separated from the extrusion machine by the cutting device. The cutting device includes a frame member having a plurality of cutter wires. The frame member is linked to a motor which moves the frame member in a reciprocating manner. The cutter wires cut the extruded dough as the cutter wires pass by the extrusion holes of the extrusion dieplate. The cut, extruded potato dough french fries fall into a french fry basket ready for deep-fat frying. The extrusion apparatus is designed such that french fries are extruded in a discontinuous manner. In addition, successive extrusions of potato dough produces french fries of a uniform length.

There is a continuing need for improved apparatus for depositing semi-solid, starch based food products. Specifically, there is a need for a depositing apparatus that can produce starch based food product strands in a continuous manner. The depositing apparatus should produce food product strands of varying lengths to create a more natural looking and appealing food product.

SUMMARY OF THE INVENTION

The present invention is an apparatus for producing dehydrated hash brown potato strands having varying lengths from a potato slurry. The depositing apparatus includes a plurality of depositing assemblies. Each depositing assembly includes an inlet and a plurality of outlets. A storage receptacle containing a supply of potato slurry is coupled to the inlets of the depositing assemblies via a pump member. The pump member provides pressure to force the potato slurry through the plurality of outlets of the depositing assemblies. A valve element associated with the pump member is configured such that any one or more of the plurality of depositing assemblies can be coupled to the pump member depending upon the desired quantity of dehydrated hash brown potato strands to be produced.

The depositing apparatus further includes a plurality of valve mechanisms. A single valve mechanism is positioned adjacent the outlets of each of the depositing assemblies. Each valve mechanism includes a plurality of moveable valve members that correspond to the plurality of outlets of the depositing assembly. Each valve member has a first state that permits the potato slurry to be forced through the corresponding outlet and a second state that stops the flow of potato slurry through the corresponding outlet to thereby create a hash brown potato strand. Operation of the valve members is coordinated such that at least one of the plurality of valve members is in the first state when at least one of the remaining valve members is in the second state.

A conveyor mechanism is positioned beneath the plurality of outlets of the depositing assemblies. The conveyor mechanism moves past the depositing assemblies such that formed hash brown potato strands are removed from the outlets by the conveyor mechanism. The hash brown potato strands are carried by the conveyor mechanism to a drier positioned distally of the outlets of the depositing assemblies. The drier dehydrates the formed hash brown potato strands as the conveyor mechanism moves through the drier.

Each valve mechanism includes a rotatory valve component which is positioned proximally of the plurality of outlets of its corresponding depositing assembly. Each rotary valve component carries a plurality of wiper blades that define the valve members. A drive motor coupled to each rotary valve component rotates the valve component relative to the outlets of the depositing assembly, thereby moving each of the wiper blades between the first and second states. The wiper blades are arranged about each rotary valve component in a staggered, stepwise manner so that only one third of the total number of wiper blades are in their second state at any give time.

The speed at which each rotary valve component rotates relative to the outlets of the corresponding depositing assembly determines the length of the hash brown potato strands produced by that depositing assembly. Hence, each rotary valve component can be operated at a different rotational rate of speed so that the depositing apparatus produces hash brown potato strands of varying lengths. In addition, or as an alternative thereto, the length of the potato strands produced by the depositing apparatus can be controlled by using different sizes of wiper blades. Hence, each rotary valve component could be equipped with wiper blades of different sizes such that the size of the wiper blades varies from one rotary valve component to the next. In addition, or as an alternative thereto, the sizes of the wiper blades can be varied within a single rotary valve component to produce potato strands of varying lengths. Different speeds of the rotary valve components and different sizes of wiper blades alters the amount of potato slurry extruded through the outlets of the depositing assemblies and thereby the length of the hash brown potato strands.

This depositing apparatus is relatively uncomplicated and can produce hash brown potato strands in a continuous manner through the use of valve mechanisms which only prevent the extrusion of potato slurry through one third of the depositing assemblies outlets at any given time. This results in minimal mechanical or hydraulic damage to the starch cells of the hash brown potato strands. In addition, the depositing apparatus is capable of producing hash brown potato strands of varying lengths to create a more natural looking and appealing food product.

BRIEF DESCRIPTION OF THE DRAWINGS

FIG. 4 is a top plan view of an extrusion housing that forms part of the depositing assembly shown in FIG. 2.

FIG. 5 is an enlarged sectional view partially broken away of a portion of the depositing assembly of FIG. 2.

FIG. 6 is an enlarged sectional view partially broken away of the extrusion housing of the depositing assembly taken along line 6—6 of FIG. 2.

FIG. 7 is an elevational view of a valve mechanism that forms part of the depositing apparatus shown in FIG. 1.

FIG. 8 is a generated view of the valve mechanism shown in FIG. 7.

DETAILED DESCRIPTION OF THE PREFERRED EMBODIMENTS

Figure 1:
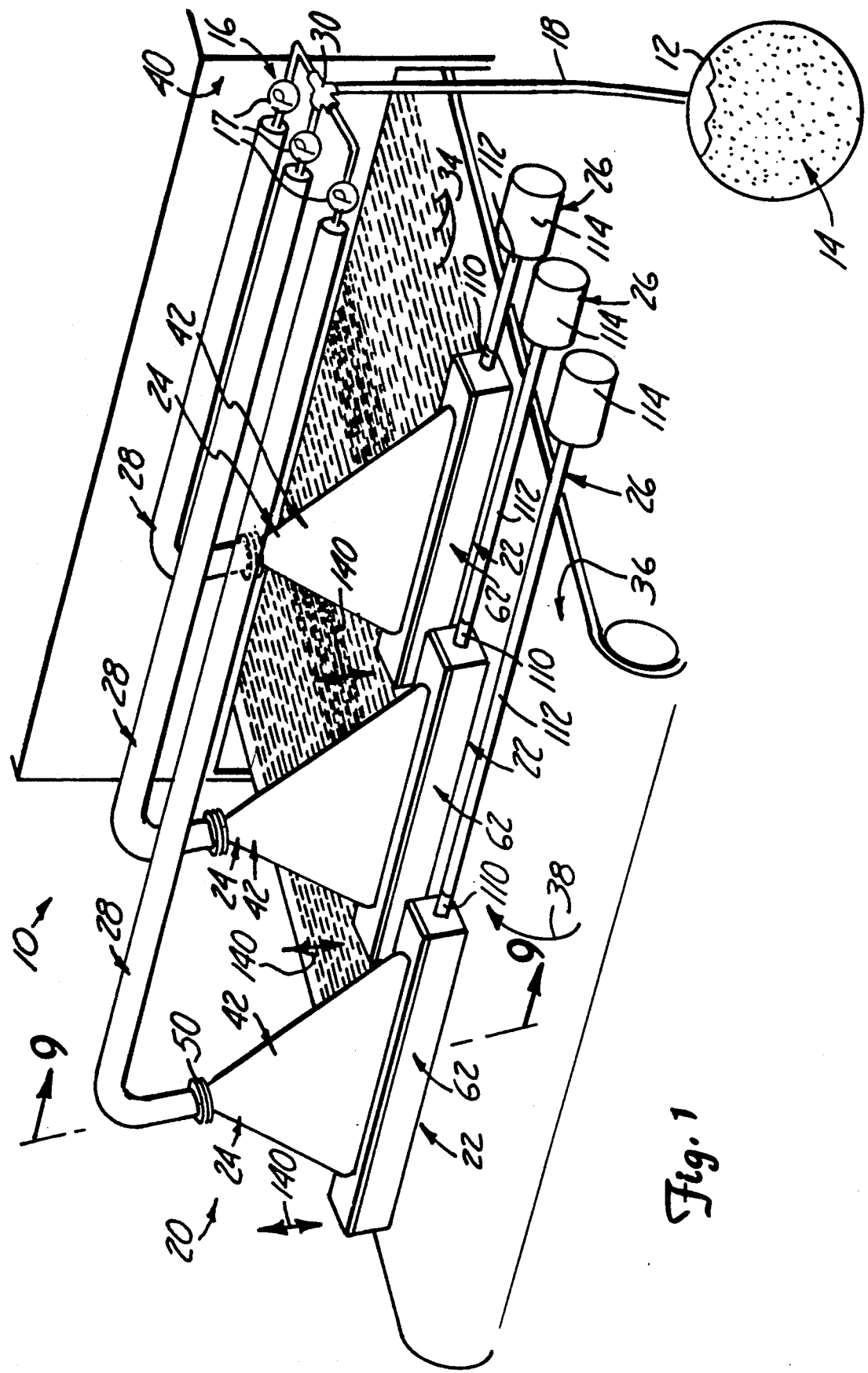
FIG. 1 is a perspective view of a hash brown depositing apparatus in accordance with the present invention.

An apparatus 10 for depositing semi-solid, starch based food products, such as strands of hash brown potatoes in accordance with the present invention, is illustrated generally in FIG. 1. The depositing apparatus 10 includes a reservoir 12 that contains a supply of potato slurry 14. The potato slurry 14 is formed by combining dehydrated potato granules and selected flavor and texture enhancing additives with water. This mixture is then heated to hydrate the potato granules until the desired consistency of the potato slurry 14 is achieved.

A pump assembly 16 is coupled to the reservoir 12 through a supply line assembly 18. The pump assembly 16 is defined by a plurality of pump members 17. The pump members 17 take potato slurry 14 from the reservoir 12 and deliver the potato slurry 14 in a continuous flow to an extrusion system 20 defined by a plurality of extrusion devices 22 (three pump members 17 and three extrusion devices 22 being shown in FIG. 1). Each extrusion device 22 includes a depositing assembly 24, a valve mechanism 26 and a flow conduit 28. The flow conduit 28 of each extrusion device 22 is coupled to a respective pump member 17 of the pump assembly 16. The pump members 17 of the pump assembly 16 are coupled to the reservoir 12 via a valve element 30 located within the supply line assembly 18 upstream of the pump members 17. The valve element 30 can be set to couple the reservoir 12 (and thereby the flow of potato slurry 14) to any one or more of the pump members 17 associated with the extrusion devices 22, depending upon the desired quantity of hash brown potato strands 34 to be produced by the depositing apparatus 10. Each of the pump members 17 operates at a very low pressure, on the order of three to ten atmospheres. This low pressure prevents damage to the starch cells of the potato slurry 14.

As seen in FIG. 1, hash brown potato strands 34 exiting the depositing assemblies 24 of the extrusion devices 22 are removed from and carried away from the extrusion system 20 via a conveyor mechanism 36 moving in the direction of arrow 38. The conveyor mechanism 36 is made out of a coarse, stainless steel wire weave that permits air to penetrate the conveyor mechanism 36 to facilitate drying of the hash brown potato strands 34.

A drier 40 is positioned distally of the extrusion system 20. The drier 40 dehydrates the hash brown potato strands 34 as the conveyor mechanism 36 moves through the drier 40. The hash brown potato strands 34 are approximately 80% by weight moisture when they enter the drier 40. The drier 40 dries the hash brown potato strands 34 down to approximately 4%-8% by weight moisture. Once the potato strands 34 have been dehydrated, they are packaged and then sent out to buyers.

Figure 2:
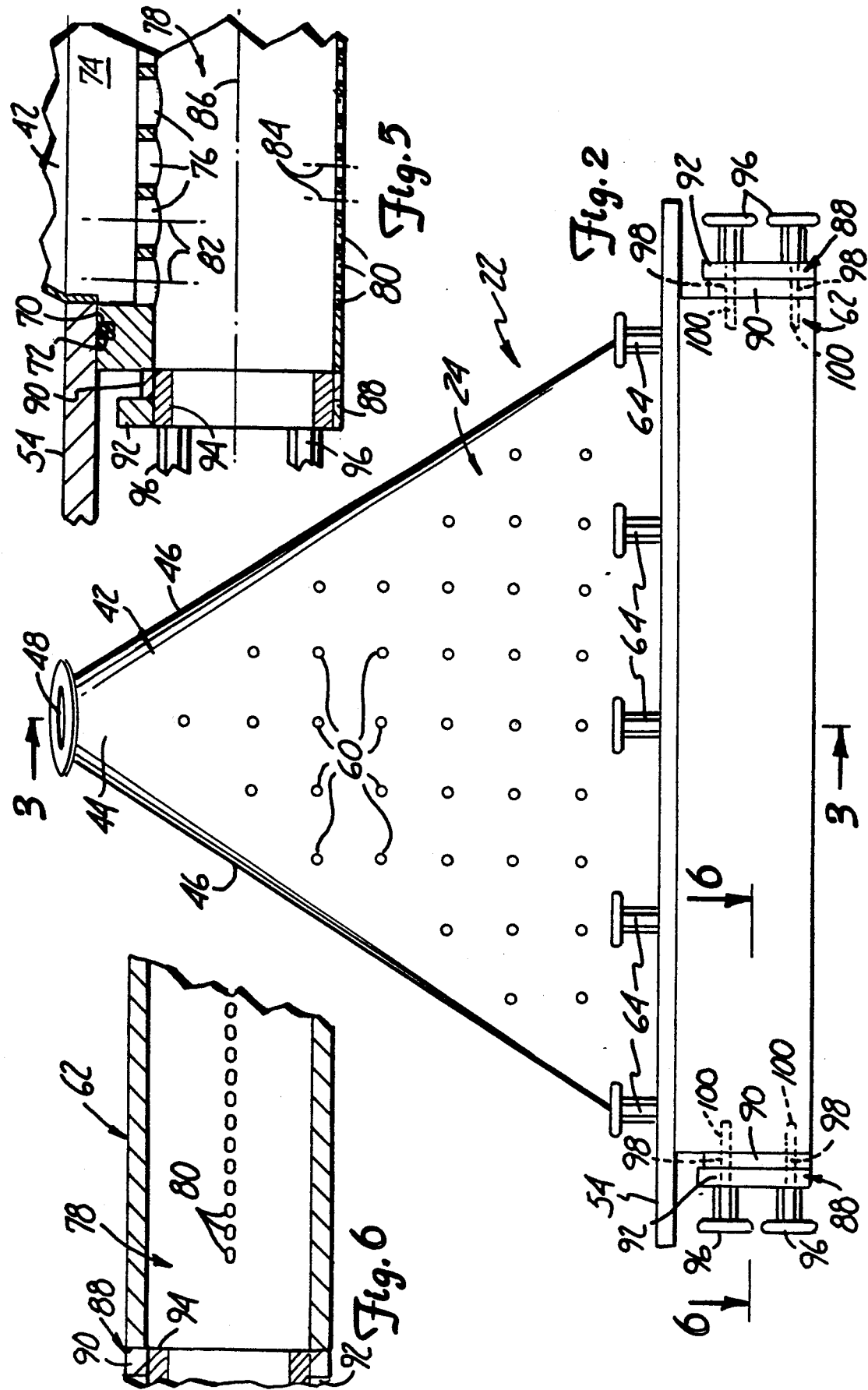
FIG. 2 is a side elevational view of a depositing assembly that forms part of an extrusion system of the depositing apparatus shown in FIG. 1.
Figure 3:
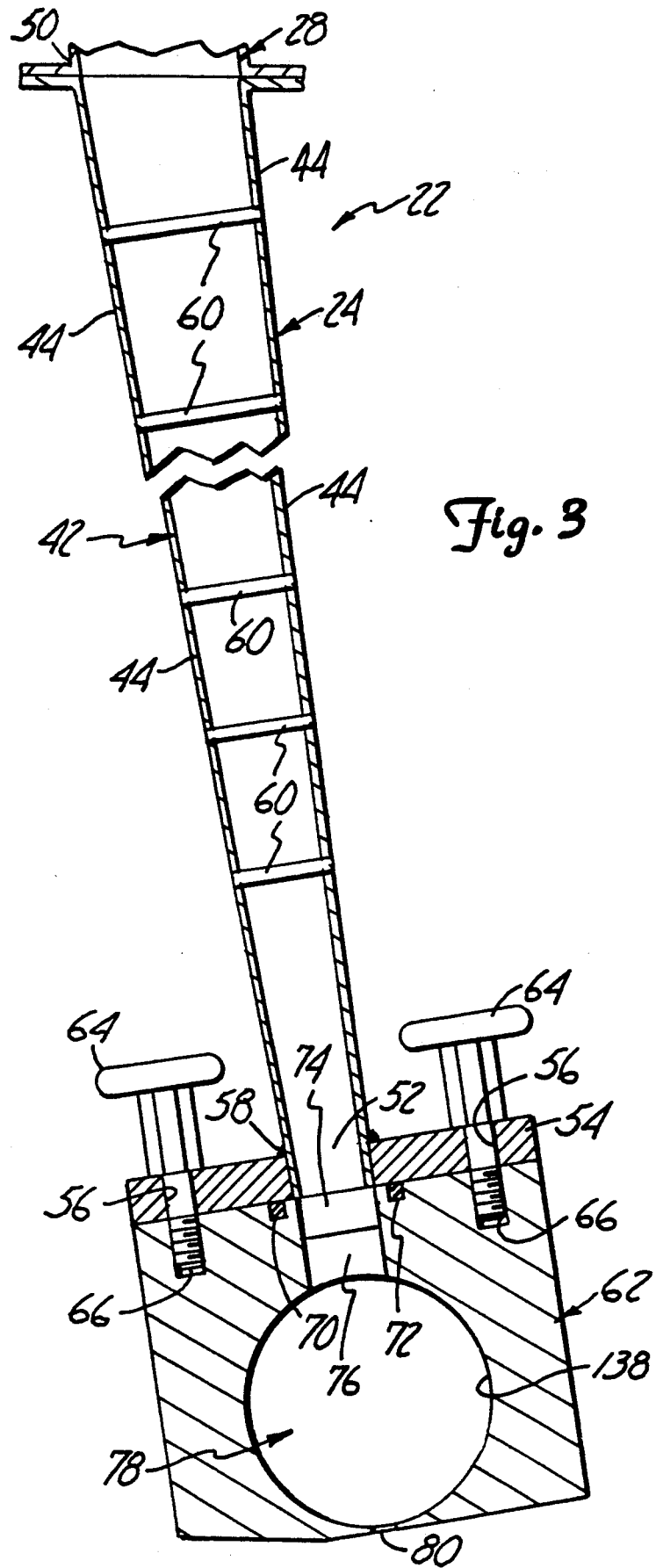
FIG. 3 is a sectional view of the depositing assembly taken along line 3—3 in FIG. 2.

The extrusion devices 22 are substantially identical, hence, only one extrusion device 22 will be described with particularity. As seen in FIGS. 2 and 3, the depositing assembly 24 of the extrusion device 22 includes a cone shaped dispersion member 42 defined by a pair of substantially planar, triangular side walls 44 and curved end walls 46. The dispersion member 42 has at its upper end an entry port 48 in fluid flow communication with a distal end 50 of the flow conduit 28. The dispersion member 42 tapers outwardly and downwardly from the entry port 48 to an oval shaped exit port 52. A mounting plate 54 having a plurality of mounting apertures 56 is secured to bottom edge 58 of the dispersion member 42. The cone shape of the dispersion member 42 (see FIG. 2) acts to disperse the flow of potato slurry 14 to aid in equalizing slurry flow pressure at the exit port 52. As seen best in FIG. 3, a plurality of tie rods 60 extend between the side walls 44 to strengthen and rigidify the dispersion member 42.

The depositing assembly 24 of the extrusion device 22 further includes an extrusion housing 62. The extrusion housing 62 is coupled to a lower surface of the mounting plate 54 of the dispersion member 42 by way of a plurality of T-bolts 64. As seen best in FIG. 3, the T-bolts 64 extend through the mounting apertures 56 of the mounting plate 54 to threadably engage threaded apertures 66 of the extrusion housing 62. As seen in FIG. 4, a top surface 68 of the extrusion housing 62 includes an oval shaped channel 70. The channel 70 is adapted to receive a rubber gasket 72 (see FIGS. 3 and 5) that forms a fluid tight seal between the top surface 68 of the extrusion housing 62 and the mounting plate 54 of the dispersion member 42.

The top surface 68 of the extrusion housing 62 further includes an oval slot 74 which is dimensioned to match the oval shaped exit port 52 of the dispersion member 42. Beneath the oval slot 74 are a plurality of upper extrusion holes 76 arranged linearly along the oval slot 74. As seen best in FIGS. 3 and 5, the extrusion housing 62 further includes a cylindrical bore 78 that extends parallel to the longitudinal extent of the extrusion housing 62. The cylindrical bore 78 is in fluid flow communication with the upper extrusion holes 76.

Beneath the cylindrical bore 78 are a plurality of lower extrusion holes 80 aligned end-to-end as with the upper extrusion holes 76. The lower extrusion holes 80 are in fluid flow communication with the cylindrical bore 78. Central axes of the upper and lower extrusion holes 82 and 84, respectively, are substantially parallel to one another and substantially perpendicular to a longitudinal axis 86 of the cylindrical bore 78.

As seen in FIG. 6, each of the lower extrusion holes 80 has an oval shape, and it is this shape that determines the cross sectional shape of the hash brown potato strands 34. The number and size of the lower extrusion holes 80 depends upon the length of the extrusion housing 62 and the desired shape of the deposited hash brown potato strands 34.

Each of the upper extrusion holes 76 is circular in shape. In addition, there are fewer upper extrusion holes 76 than lower extrusion holes 80 since the upper extrusion holes 76 are much larger than the lower extrusion holes 80. The large size of the upper extrusion holes 76 helps to evenly distribute the potato slurry 14 to the cylindrical bore 78.

As seen in FIGS. 2 and 5, bearing supports 88 are mounted to the ends of the extrusion housing 62. Each bearing support 88 includes first and second bearing holders 90 and 92, respectively, that are adapted to carry an annular bearing member 94. Each bearing support 88 is secured to the extrusion housing 62 by way of T-bolts 96. The T-bolts 96 extend through the mounting apertures 98 of the bearing support 88 to threadably engage threaded apertures 100 of the extrusion housing 62. The annular bearing members 94 of the bearing supports 88 are adapted to rotatably support a drum shaped, rotary valve component 102 of the valve mechanism 26 within the cylindrical bore 78 of the extrusion housing 62.

As seen in FIGS. 7 and 8, the rotary valve component 102 includes a cylindrical center portion 104 and opposite cylindrical end portions 106 and 108, respectively, that engage the bearing members 94. With the rotary valve component 102 supported by the bearing members 94, the bearing members 94 together with the bearing supports 88 and a seal located inward of the bearing members 94 prevent pressurized potato slurry 14 from leaking through the ends of the extrusion housing 62. The end portion 108 of the rotary valve component 102 includes a drive coupler 110. As seen in FIG. 1, the drive coupler 110 is engaged by a drive shaft 112 of an electric drive motor 114. Actuation of the drive motor 114 rotates the rotary valve component 102 within the cylindrical bore 78.

Figure 9:
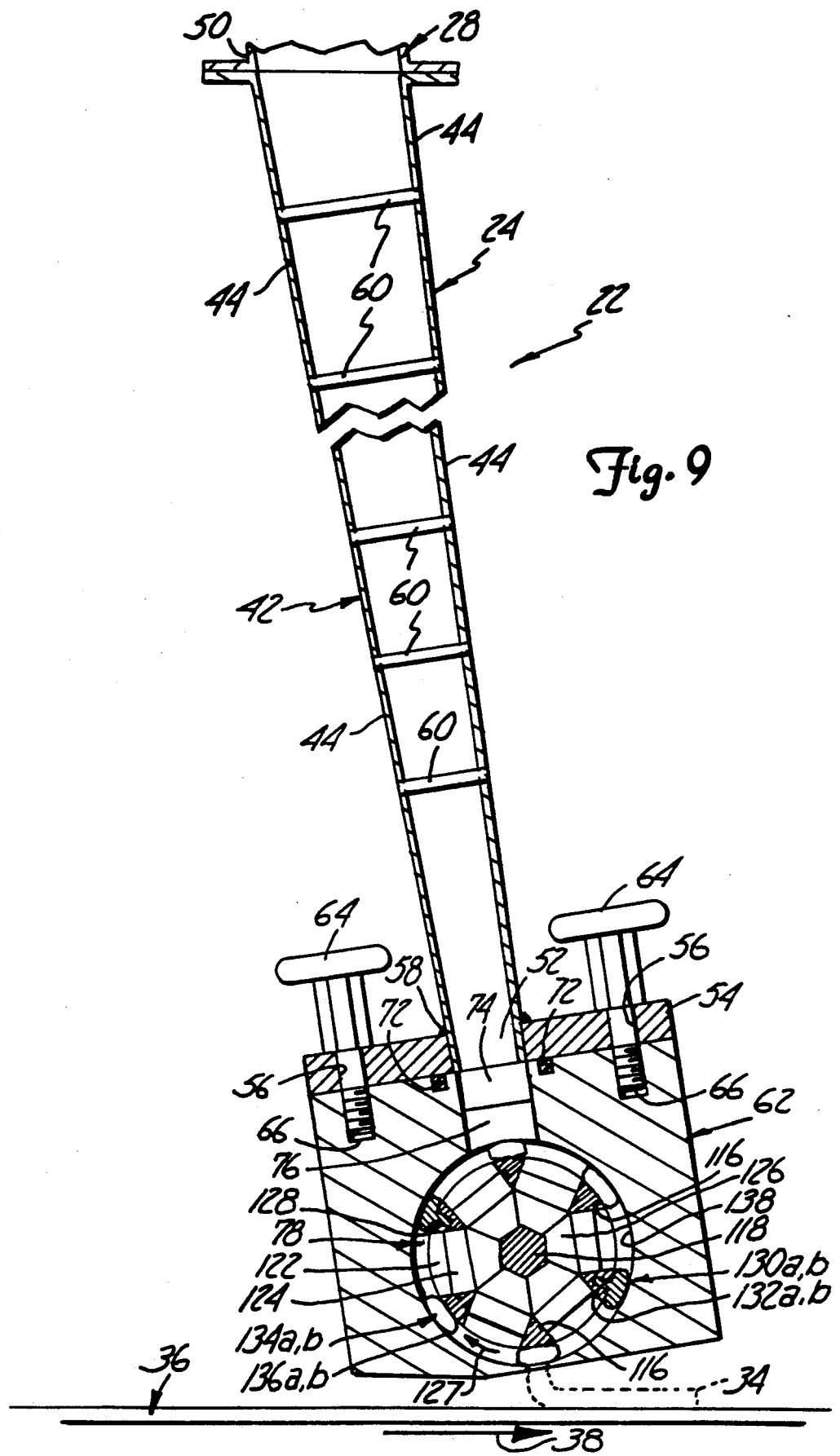
FIG. 9 is a sectional view partially broken away of the extrusion system, taken along line 9—9 in FIG. 1, in the process of forming hash brown potato strands.
Figure 10:
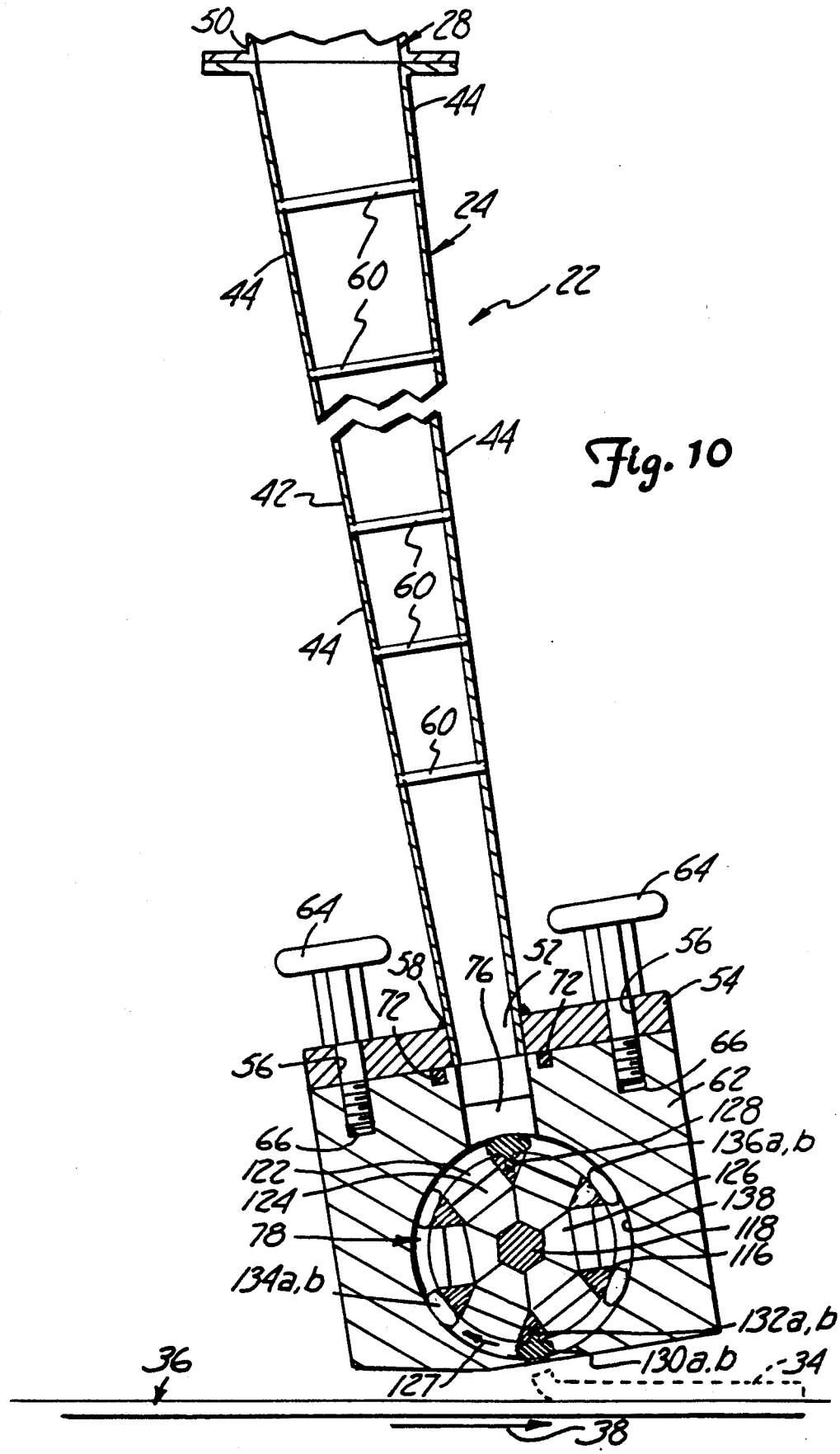
FIG. 10 is a sectional view partially broken away similar to FIG. 9 showing the hash brown potato strands being removed from the extrusion system by a conveyor mechanism.

The center portion 104 of the rotary valve component 102 is defined by a plurality of evenly spaced, longitudinally extending surface supports 116, and a center attachment 118. The center attachment 118 extends along the longitudinal axis 120 of the rotary valve component 102 between the end portions 106 and 108. As seen in FIGS. 9 and 10, the center attachment 118 appears hexagonal in cross section whereas the surface supports 116 appear triangular in cross section. The center attachment 118 adds structural rigidity to the rotary valve component 102.

As seen best in FIG. 7, between the surface supports 116 the rotary valve component 102 has longitudinal slots 122. Directly beneath each longitudinal slot 122 are a plurality of circular through openings 124 arranged linearly along the longitudinal slot 122. The through openings 124 are of the same dimension as, and are aligned with, the upper extrusion holes 76 of the extrusion housing 62. The area between the lower edges of the surface supports 116 and the center attachment 118 defines a void 126.

Figure 11:
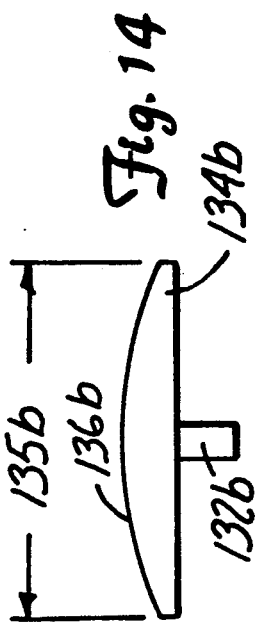
FIG. 11 is an end elevational view of a wiper blade that forms part of the valve mechanism.
Figure 12:
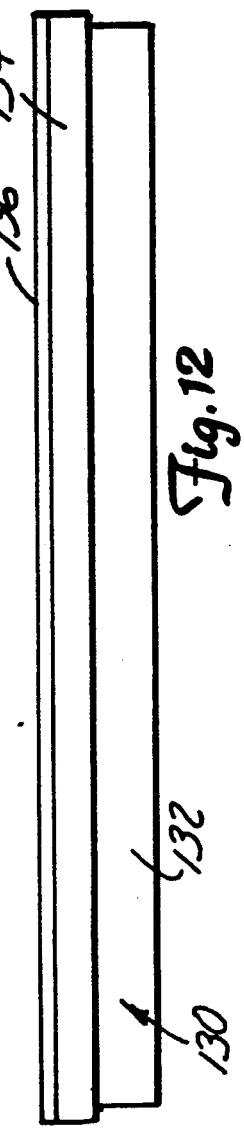
FIG. 12 is a side elevational view of the wiper blade shown in FIG. 11.

Each surface support 116 includes plural longitudinal channels 128. Each longitudinal channel 128 is adapted to removably and movably support a valve member, such as a preferably T-shaped wiper blade 130 (see FIGS. 9 and 10). As seen in FIGS. 11 and 12, each T-shaped wiper blade 130 is defined by a root portion 132 and a head portion 134 having a lateral dimension 135. The root portion 132 is adapted to be removably received within the longitudinal channel 128 for limited radial movement relative to the rotary valve component 102. The head portion 134 of each wiper blade 130 has a curved top surface 136 that is adapted to ride along a side wall 138 of the cylindrical bore 78. As seen best in FIG. 8, the longitudinal channels 128 from one surface support 116 to the next surface support are arranged in a staggered, stepwise manner. Therefore, the wiper blades 130 are arranged in a staggered stepwise fashion about the rotary valve component 102.

Figure 13:
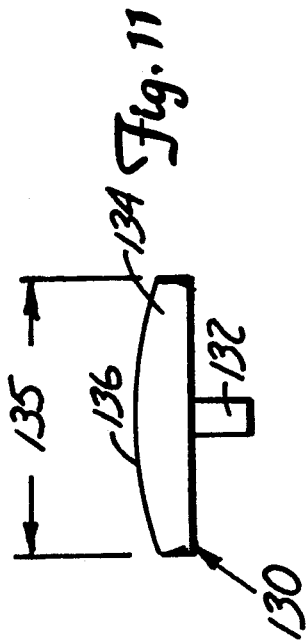
FIG. 13 is an end elevational view of a further wiper blade.
Figure 14:
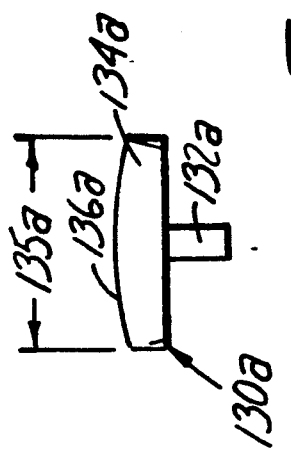
FIG. 14 is an end elevational view of a still further wiper blade.

A further wiper blade 130a is illustrated in FIG. 13. The lateral dimension 135a of the wiper blade 130a is less than the lateral dimension 135 of the wiper blade 130. Another wiper blade 130b is illustrated in FIG. 14. The lateral dimension 135b of the wiper blade 130b is greater than the lateral dimension 135 of the wiper blade 130.

The speed at which each rotary valve component 102 rotates relative to the lower extrusion holes 80 of the corresponding depositing assembly 24 determines the length of the hash brown potato strands 34 produced by that depositing assembly 24. Hence, each rotary valve component 102 can be operated at a different rotational rate of speed so that the depositing apparatus 10 produces hash brown potato strands 34 of varying lengths. In addition, or as an alternative thereto, the length of the potato strands 34 produced by the depositing apparatus 10 can be controlled by using different sizes (i.e., lateral dimension) of wiper blades 130, 130a and 130b. For example, a larger head portion 134b lateral dimension 135b produces a smaller length potato strand 34, while a smaller head portion 134a lateral dimension 135a produces a potato strand 34 of longer length. Hence, each rotary valve component 102 could be equipped with wiper blades 130, 130a and 130b of different sizes such that the size of the wiper blades 130, 130a and 130b used varies from one rotary valve component 102 to the next rotary valve component 102. In addition, or as an alternative thereto, the sizes of the wiper blades 130, 130a and 130b used can be varied within a single rotary valve component 102 to produce potato strands 34 of varying lengths. Different speeds of the rotary valve components 102 and different sizes of wiper blades 130, 130a and 130b alters the amount of potato slurry 14 extruded through the lower extrusion holes 80 of the depositing assemblies 24 and thereby the length of the hash brown potato strands 34. In addition, the viscosity of the potato slurry 14 and the pump pressure of the pump members 17 can affect the length of the potato strands 34 to a minimal degree. Hash brown potato strands 34 of a single length can be produced by the depositing apparatus 10 by operation of all of the rotary valve components 102 at the same rotational rate of speed and the provision of wiper blades of the same size.

Rotation of a rotary valve component 102 moves its respective wiper blades 130, 130a and 130b between a first state that permits the potato slurry 14 to be forced through corresponding lower extrusion holes 80 and a second state that stops the flow of potato slurry 14 through the corresponding lower extrusion holes 80 to create hash brown potato strands 34. Operation of the wiper blades 130, 130a and 130b is coordinated such that at least one of the plurality of wiper blades 130, 130a and 130b is in the first state when at least one of remaining wiper blades 130, 130a and 130b is in the second state. Extrusion pressure at the extrusion holes 80 is approximately on the order of one to three atmospheres. As is apparent from FIGS. 7 and 12, the wiper blades 130, 130a and 130b are long enough to eclipse a set (i.e., plural) lower extrusion holes 80 when that wiper blade 130, 130a and 130b is in its second state.

Each of the extrusion devices 22 can be individually adjusted (as shown by the double headed arrows 140 in FIG. 1) relative to the conveyor mechanism 36 such that the distance between the extrusion devices 22 and the conveyor mechanisms can be varied to accommodate different strand lengths of potato strands 34. The dispersion members 42, extrusion housings 62 and the rotary valve components 102 are made of stainless steel. The wiper blades are made of plastic, such as a food grade acetal polymer known as DELRIN (a registered trademark of the Du Pont Co.).

In operation, the pump members 17 pump potato slurry 14 from the reservoir 12 and through the valve element 30 to the extrusion system 20. As seen in FIG. 1 the valve element 30 is set such that all three pump members 17 and extrusion devices 22 are receiving potato slurry from the reservoir 12. The potato slurry 14 enters each extrusion device 22 through the entry port 48 of the dispersion member 42. The potato slurry 14 travels down the dispersion member 42 and out of the dispersion device 42 through the exit port 52 and into the extrusion housing through oval slot 74. The potato slurry 14 then passes through the upper extrusion holes 76 and into the cylindrical bore 78.

The potato slurry 14 fills the entire area around and within the rotary valve component 102. The potato slurry 14 enters the rotary valve component 102 and flows into the void 126 of the rotary valve component 102 through the longitudinal slots 122 and the through openings 124 of the rotary valve component 102. Once the area within the cylindrical bore 78 is completely filled, pressure from the pump member 17 forces the potato slurry 14 out of the extrusion housing 62 through the lower extrusion holes 80. While the potato slurry 14 is being pumped through the extrusion device 22, the rotary valve component 102 is rotated within the cylindrical bore 78 via the drive motor 114.

FIG. 9 shows a corresponding wiper blade 130, 130a or 130b in its first state which allows the potato slurry 14 to be extruded through the lower extrusion holes 80 to produce hash brown potato strands 34. As the hash brown potato strands 34 are deposited on the conveyor mechanism 36, movement of the conveyor pulls the hash brown potato strands 34 away from the lower extrusion holes 80. As seen in FIG. 10, as the corresponding wiper blade 130, 130a or 130b covers a respective set of plural lower extrusion holes 80, the extrusion of potato strands 34 through that set of plural lower extrusion holes 80 is cutoff, and then the conveyor mechanism 36 acts to pull the potato strands 34 out of the lower extrusion holes 80. The conveyor mechanism 36 then carries the extruded hash brown potato strands 34 away from the extrusion devices 22 and to the drier 40, where the hash brown potato strands 34 are dehydrated. In one embodiment the rotary valve component 102 rotates in the direction of arrow 127 (see FIGS. 9 and 10) with movement of the conveyor mechanism 36 in the preferred direction of arrow 38. Alternatively, movement of the conveyor mechanism 36 relative to the extrusion devices 22 in a direction opposite to that indicated by the arrow 38 is possible.

As the rotary valve components 102 rotate, the potato slurry 14 tends to push the head portions 134, 134a and 134b of the wiper blades 130, 130a and 130b against the sidewall 138 of the cylindrical bore 78. As the wiper blades 130, 130a and 130b become worn, the pressure of the potato slurry 14 tends to draw the wiper blades 130, 130a and 130b out of the longitudinal channels 128 such that the head portions 134, 134a and 134b of the wiper blades 130, 130a and 130b continuously ride against the sidewalls 138 of the cylindrical bores 78. Eventually, the wiper blades 130, 130a and 130b wear out and need to be replaced. The wiper blades 130, 130a and 130b are easily replaced by simply removing the worn wiper blades 130, 130a and 130b from the longitudinal channels 128 of the rotary valve components 102 and inserting new ones. In addition, radial movement of the wiper blades 130, 130a and 130b relative to the longitudinal channels 128 can occur so that the wiper blades 130, 130a and 130b can conform to the sidewalls 138 of the cylindrical bores 78, if the rotary valve components 102 are not sufficiently centered within the cylindrical bores 78.

The depositing apparatus 10 is relatively uncomplicated and can produce hash brown potato strands 34 in a continuous manner through the use of valve mechanisms 26 which only prevent the extrusion of potato slurry 14 through one third of the lower extrusion holes 80 of the depositing assemblies 24 at any given time. This allows the pump members 17 to operate at a constant pump pressure (i.e., without pump pressure fluctuations that may occur if extrusion through all the extrusion holes is prevented at one time), which results in minimal mechanical or hydraulic damage to the starch cells of the hash brown potato strands 34. In addition, the depositing apparatus 10 is capable of producing hash brown potato strands 34 of varying lengths to create a more natural looking and appealing food product.

Although the present invention has been described with reference to preferred embodiments, workers skilled in the art will recognize that changes may be made in form and detail without departing from the spirit and scope of the invention.

What is claimed is:

1. An apparatus for forming strands of semi-solid food product, comprising:
   a depositing assembly having an inlet at a first end and a plurality of outlets at a second end;
   a pressure system coupled to the inlet of the depositing assembly for forcing a continuous flow of semi-solid food product through the depositing assembly and out through the plurality of outlets; and
   a valve mechanism positioned adjacent the plurality of outlets, the valve mechanism including:

a movable support member;

a plurality of valve members corresponding to the plurality of outlets, the plurality of valve members being movable with the support member such that each valve member has a first state that permits the semi-solid food product to be forced through the corresponding outlet and a second state that stops the flow of semi-solid food product through the corresponding outlet to create a semi-solid food product strand, operation of the plurality of valve members being coordinated such that at least one of the plurality of valve members is in the first state when at least one of remaining valve members is in the second state; and support means on the movable support member for allowing movement of the valve members relative to and permitting the valve members to be readily removed from the support member.

2. The forming apparatus of claim 1 wherein the pressure system includes:

a storage receptacle for containing a supply of semi-solid food product; and a pump system coupled between the storage receptacle and the inlet of the depositing assembly, the pump system providing pressure to force the semi-solid food product through the plurality of outlets of the depositing assembly.

3. The forming apparatus of claim 1 wherein the depositing assembly includes:

a cone shaped dispersion member having at its upper end an entry port defined by the inlet of the depositing assembly and at its lower end an oval shaped exit port, the dispersion member acting to disperse the flow of semi-solid food product to aid in equalizing flow pressure at the exit port; and an extrusion housing coupled to the lower end of the dispersion member, the extrusion housing including a plurality of upper extrusion holes in aligned registry with the exit port of the dispersion member and a plurality of sets of plural lower extrusion holes, the plurality of sets of lower extrusion holes defining the plurality of outlets of the depositing assembly.

4. The forming apparatus of claim 3 wherein each of the upper and lower extrusion holes has a central axis and wherein the extrusion housing further includes a cylindrical bore having a longitudinal axis that extends substantially perpendicular to central axes of the upper and lower extrusion holes, the cylindrical bore coupling the upper extrusion holes to the plurality of sets of plural lower extrusion holes such that the flow of semi-solid food product travels from the inlet port of the dispersion member through the exit port, upper extrusion holes, and cylindrical bore and out of the extrusion housing through the plurality of sets of plural lower extrusion holes.

5. The forming apparatus of claim 4 wherein the movable support member is a rotary valve component rotatably mounted within the cylindrical bore of the extrusion housing, and wherein the plurality of valve members are a plurality of wipers removably and movably mounted on the rotary valve component by way of the support means.

6. The forming apparatus of claim 5 wherein each of the wipers is defined by a root portion and a head portion, and wherein rotation of the rotary valve component moves the head portions of the wipers relative to the plurality of sets of plural lower extrusion holes between the first and second states.

7. The forming apparatus of claim 6 wherein the valve mechanism further includes: drive means coupled to the rotary valve component for rotating the rotary valve component within the cylindrical bore relative to the upper and lower extrusion holes such that the speed at which the rotary valve component rotates relative to the plurality of sets of plural extrusion holes determines the length of the strands of semi-solid food product formed by the forming apparatus.

8. The forming apparatus of claim 6 wherein the head portion of each of the wipers is dimensioned to close off one set of plural extrusion holes when that head portion is in its second state.

9. The forming apparatus of claim 8 wherein a lateral dimension of each of the head portions of the plurality of wipers determines the length of the strands of semi-solid food product formed by the forming apparatus.

10. The forming apparatus of claim 6 wherein the plurality of wipers are arranged in a staggered relationship about the rotary valve component such that only about one-third of wipers are in the second state at any given time.

11. The forming apparatus of claim 6 wherein the support means includes: a plurality of longitudinally extending surface supports on the rotary valve component, the surface supports having longitudinal channels with each channel removably and movably receiving the root portion of a corresponding wiper.

12. The forming apparatus of claim 11 wherein between surface supports the rotary valve component has longitudinal slots that permit the semi-solid food product to flow through the rotary valve component from the upper extrusion holes to the lower extrusion holes.

13. The forming apparatus of claim 12 wherein between surface supports of the rotary valve component and adjacent the longitudinal slots, the rotary valve component includes a plurality of through openings whose dimensions correspond to the upper extrusion holes.

14. The forming apparatus of claim 1 wherein the semi-solid food product is a potato slurry and wherein the pressure system includes:

a pump system coupled to the inlet of the depositing assembly, the pump system operating at a low pressure of between approximately three to ten atmospheres to minimize damage to starch cells of the potato slurry.

15. A hash brown depositor for producing strands of dehydrated hash brown potatoes having varying lengths from a potato slurry, comprising:

a plurality of depositing assemblies with each depositing assembly having an inlet at a first end and a plurality of outlets at a second end;

a storage receptacle for containing a potato slurry;

a pump system coupled between the storage receptacle and each of the inlets of the plurality depositing assemblies, the pump system providing pressure to force the potato slurry through the plurality of outlets of the depositing assemblies;

a valve element associated with the pump system for coupling the pump system to at least one of the plurality of depositing assemblies depending upon a desired quantity of dehydrated hash brown potato strands to be produced;

a plurality of valve mechanisms, one valve mechanism positioned adjacent the outlets of each of the depositing assemblies, each valve mechanism including:

a movable support member;

a plurality of valve members corresponding to the plurality of outlets, the plurality of valve members being movable with the support member such that each valve member has a first state that permits the potato slurry to be forced through the corresponding outlet and a second state that stops the flow of potato slurry through the corresponding outlet to create a hash brown potato strand, operation of the plurality of valve members being coordinated such that at least one of the plurality of valve members is in the first state when at least one of remaining valve members is in the second state; and support means on the movable support member for allowing movement of the valve members relative to and permitting the valve members to be readily removed from the support member;

a conveyor mechanism positioned beneath the outlets of the depositing assemblies, the conveyor mechanism being configured to move past the depositing assemblies such that formed hash brown potato strands are removed from the outlets by the conveyor mechanism; and a drier positioned distally of the outlets of the depositing assemblies for dehydrating the formed hash brown potato strands as the conveyor mechanism moves through the drier.

16. The hash brown depositor of claim 15 wherein the movable support member of each valve mechanism is a rotary valve component positioned proximally of the plurality of outlets, the rotary valve component removably and movably carrying a plurality of wiper blades that define the valve members.

17. The hash brown depositor of claim 16 wherein each valve mechanism further includes: a drive motor coupled to the rotary valve component for rotating the rotary valve component relative to the plurality of outlets thereby moving the wiper blades between first and second states relative to its corresponding outlet, the speed at which the drive motor rotates the corresponding rotary valve component relative to its corresponding outlets determining the length of hash brown potato strands produced by the hash brown depositor.

18. The hash brown depositor of claim 16 wherein a lateral dimension of each of the plurality of wiper blades of the valve mechanisms determines the length of the hash brown potato strands produced by the hash brown depositor.

19. The hash brown depositor of claim 18 wherein the lateral dimension of the wiper blades of each valve mechanism differs so that each depositing assembly produces a different strand length of hash brown potato strands.

20. The hash brown depositor of claim 15 wherein each of the valve mechanisms is adjustable such that the distance between the outlets and the conveyor mechanism can be varied to accommodate different strand lengths of hash brown potato strands.

* * * * *

UNITED STATES PATENT AND TRADEMARK OFFICE
CERTIFICATE OF CORRECTION

PATENT NO. : 5,244,370

DATED : September 14, 1993

INVENTOR(S) : JIMMY A. DEMARS

It is certified that error appears in the above-identified patent and that said Letters Patent is hereby corrected as shown below:

On the Title Page of the Patent,
   delete [75] Inventor: Jimmy A. DeMars, Hugo, Minn.

insert [75] Inventors: Jimmy A. DeMars, Hugo,
                           Dennis Usgaard, New Hope
                           Steven W. Peplinski, Bloomington,
                           all of Minn.

Signed and Sealed this

Fifth Day of April, 1994

BRUCE LEHMAN

*Attest:*

*Attesting Officer*　　　*Commissioner of Patents and Trademarks*